United States Patent
Perdomo

(12) 
(10) Patent No.: US 6,215,995 B1
(45) Date of Patent: Apr. 10, 2001

(54) SUBSCRIBER UNIT AND METHOD FOR UPDATING A FUNCTION VALUE

(75) Inventor: Jorge Luis Perdomo, Boynton Beach, FL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/512,609

(22) Filed: Feb. 25, 2000

Related U.S. Application Data

(63) Continuation of application No. 09/088,043, filed on Jun. 1, 1998, now Pat. No. 6,118,995.

(51) Int. Cl.[7] ................................................. H04M 3/00

(52) U.S. Cl. .......................... 455/419; 455/575; 379/93.17

(58) Field of Search ..................................... 455/419, 575, 455/38.1, 466, 550, 551, 186.1, 418, 420, 517, 412; 379/93.17, 93.19, 354, 355, 356, 27; 340/825.44; 345/169, 156, 158, 172, 338

(56) References Cited

U.S. PATENT DOCUMENTS 6,085,098 * 7/2000 Moon et al. ......................... 455/457

* cited by examiner

Primary Examiner—Reinhard Eisenzopf
Assistant Examiner—Charles N. Appiah
(74) Attorney, Agent, or Firm—Randi L. Dulaney

(57) ABSTRACT

In a wireless communication system (10), a wireless subscriber unit (26) contains a function key (52) for performing an operation on a function value (50). The function value (50) is changed based on receipt of a message (38) sent from a transmission source (21).

8 Claims, 4 Drawing Sheets

SUBSCRIBER UNIT AND METHOD FOR UPDATING A FUNCTION VALUE

This application is a continuation of Ser. No. 09/088,043 filed on Jun. 1, 1998 now U.S. Pat. No. 6,118,995.

FIELD OF THE INVENTION

This invention pertains to wireless subscriber units which contain at least one function key.

BACKGROUND OF THE INVENTION

Historically, wireless subscriber units have had the ability to receive a message, and perform standard functions in response to the message receipt such as storing the message, displaying the message, or alerting the user of receipt of the message.

Today's wireless subscriber units are no longer restricted to just these standard functions. Manufacturers of wireless subscriber units are now adding applications to provide value added services such as calculator functions, stock market analysis, financial analysis, and tax calculation. The wireless subscriber units perform calculations within these applications using function values accessed when a function key has been activated.

One drawback of today's wireless subscriber units is the inability to modify the function value based on a received message or a geographical relocation. As wireless applications become more prevalent in the industry, and become more critical as business tools, the requirement for such a capability increases.

DESCRIPTION OF THE PREFERRED EMBODIMENT

Figure 1:
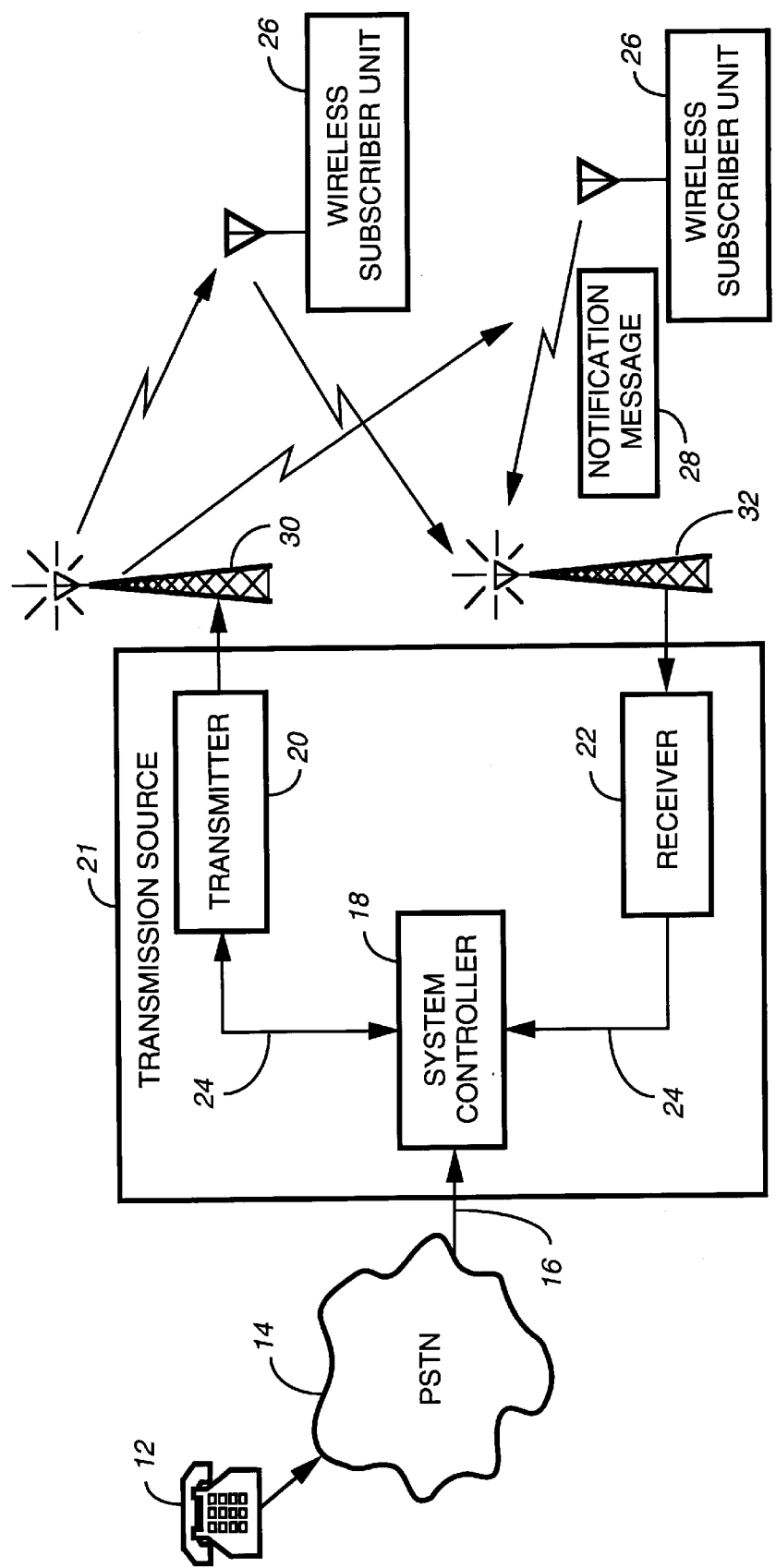
FIG. 1 is an electrical block diagram of a wireless communication system.

Referring to FIG. 1, an electrical block diagram of a wireless communication system 10 is shown in accordance with the preferred embodiment of the present invention. The wireless communication system 10 comprises a message input device, such as a conventional telephone 12 connected through a conventional switched telephone network (PSTN) 14 by conventional telephone links 16 to a system controller 18. The system controller 18 oversees the operation of at least one transmitter 20 and, in a preferred embodiment, at least one receiver 22, through one or more communication links 24, which typically are twisted pair telephone wires, and additionally can include RF, microwave, or other high quality audio communication links. The system controller 18 encodes and decodes inbound and outbound telephone addresses into formats that are compatible with land line message switch computers. The system controller 18 also functions to digitally encode and schedule outbound messages, which can include such information as alphanumeric messages for transmission by the transmitter 20 to a plurality of wireless subscriber units 26 on a set of outbound radio frequency (RF) channels. The system controller 18 further functions to decode inbound messages, including unsolicited and response messages, such as a change notification message 28 received by the receiver 22 from a wireless subscriber unit 26. A transmission source 21 comprises the system controller 18 in combination with the transmitter 20 and the receiver 22.

Examples of inbound messages are acknowledgments and designated response messages. Designated response messages are communicated in the inbound channel in portions named data units. An acknowledgment is a response to an outbound message initiated at the system controller 18. An example of an outbound alphanumeric message intended for a wireless subscriber unit 26 is a page message entered from the telephone 12. The outbound messages are included in outbound radio signals transmitted from a conventional antenna 30 coupled to the transmitter 20. The inbound messages are included in inbound radio signals received by a conventional antenna 32 coupled to the receiver 22.

It will be appreciated that the wireless subscriber units 26 may be, for example, one and two way pagers, conventional mobile cellular telephones, conventional mobile radios, conventional mobile cellular telephones or trunked mobile radios. In the following description, the term wireless subscriber unit 26 will be used to refer to any of the wireless subscriber units listed above. Each of the wireless subscriber units 26 assigned for use in the wireless communication system 10 has an address assigned thereto which is a unique selective call address in the wireless communication system 10. The address enables the transmission of a message from the system controller 18 only to the addressed wireless subscriber unit 26, and identifies messages and responses received at the system controller 18 from the wireless subscriber unit 26. Furthermore, each of one or more of the wireless subscriber units 26 also can have a unique telephone number assigned thereto which is entered by a user sending a message via the PSTN 14, to identify the intended wireless subscriber unit 26. The telephone number is unique within the PSTN 14. A list of the assigned addresses and correlated telephone numbers for the wireless subscriber units 26 is stored in the system controller 18 in the form of a subscriber data base.

Figure 2:
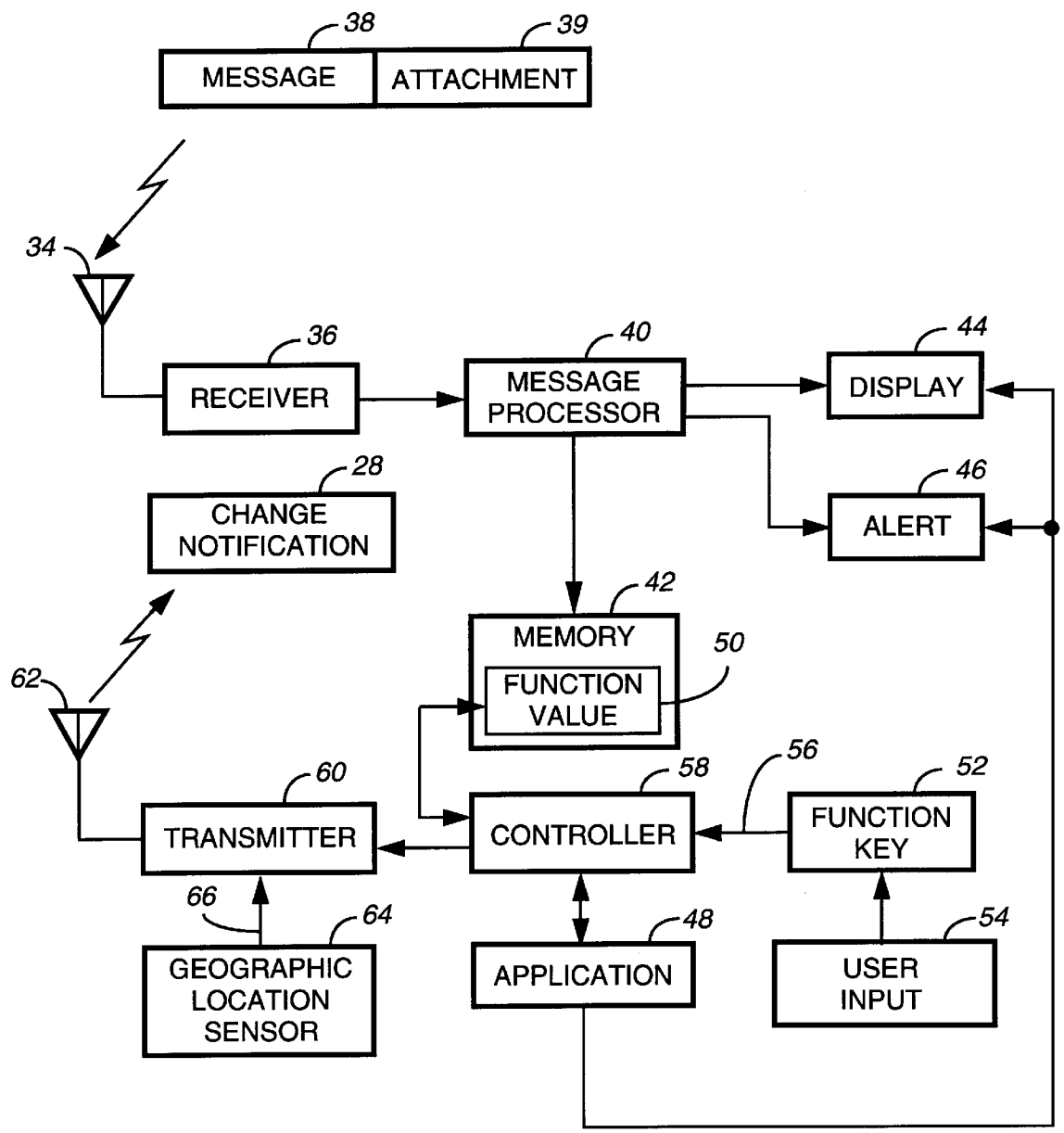
FIG. 2 is an electrical block diagram of a wireless subscriber unit that operates within the wireless communication system of FIG. 1 in accordance with the invention.

FIG. 2 is an electrical block diagram of a wireless subscriber unit 26 that operates within the wireless communication system 10 of FIG. 1. The wireless subscriber unit 26 comprises an antenna 34 for intercepting RF signals from the wireless communication system 10. The antenna 34 is coupled to a receiver 36 employing conventional demodulation techniques for receiving the communication signals transmitted by the wireless communication system 10 such as a message 38. Included in a communication signal of a message 38 may also be an attachment 39 containing further required information for value added services utilization, for example. Radio frequency signals received by the receiver 36 produce demodulated information, which is coupled to a message processor 40 for processing received messages, and, optionally, attachments to messages.

To perform the necessary functions of the wireless subscriber unit 26, the message processor 40 is coupled to a memory 42 including a random access memory (RAM), a read-only memory (ROM), and an electrically erasable programmable read-only memory (EEPROM). Preferably, the message processor 40 is similar to the M68HC11 microcontroller manufactured by Motorola, Inc. It will be appreciated that other similar processors can be utilized for the message processor 40, and that additional processors of the same or alternative type can be added as required to handle the processing requirements of the message processor 40.

The message processor 40 decodes an address in the demodulated data of the received message 38, compares the decoded address with one or more addresses stored in the memory 42, and when a match is detected, proceeds to process the remaining portion of the message 38 (and, optionally, attachment 39). Once the message processor 40 has processed the message 38 (and any attachment 39), it stores the message 38 (and the attachment 39) in the memory 42, and the message processor 40 sends a command to the display 44 and/or alert 46 to notify the user that a message has been received.

In a preferred embodiment, the wireless subscriber unit 26 includes at least one application 48 to provide a value added service such as calculator functions, stock market analysis, financial analysis, or tax calculation. The wireless subscriber unit 26 performs calculations within this application 48 using a function value 50 stored in memory 42 and accessed when a function key 52 has been activated. The function key 52, responsive to a user input, such as a user depressing the function key button, initiates an input signal 56 to a controller 58. The controller 58, in response to the input signal 56, accesses the function value 50 stored in memory 42 and provides this function value 50 to the application 48 for use in operation of the application 48. Preferably, the controller 58 is similar to the M68HC11 micro-controller manufactured by Motorola, Inc. It will be appreciated that other similar processors can be utilized for the controller 58, and that additional processors of the same or alternative type can be added as required to handle the processing requirements of the controller 58.

The addition of a controller to update a function value for an application expands the value and usefulness of the wireless subscriber unit for the end user. For example, if the end user was an international traveler, the application 48 was an expense statement, and the function value 50 was the current exchange rate to be used in operation of the expense statement, having automatic updates of this exchange rate would greatly simplify the traveler's activities.

In one embodiment of the invention, the wireless subscriber unit 26 includes a transmitter 60 coupled to a transmit antenna 62 capable of sending a change notification message 28 to the wireless communication system 10. The transmitter 60 is coupled to a geographic location sensor 64 which senses the location of the wireless subscriber unit 26. When the geographic location sensor 64 senses a change in geographic location of the wireless subscriber unit 26, it sends a signal 66 to the transmitter 60 for initiation of a change notification message 28. Referring briefly to FIG. 1, the change notification message 28 is received by the receive antenna 32, which is coupled to the receiver 22, which then decodes the information and sends the data through communication link 24 to the system controller 18. In response to receipt of a change notification message 28, the system controller 18 identifies a corresponding new function value and sends this function value to the wireless subscriber unit 26. Upon receipt of the new function value by the wireless subscriber unit 26, the new function value is stored in memory 42 replacing the current function value. The next time the function key is activated, the controller 58 will access memory 42 to retrieve the new function value, and use the new function value in operation of the application 48.

The ability to change the function value 50 based on a notification of geographic relocation expands the value of wireless subscriber units 26 with built-in applications by allowing real-time calculations without requiring a manual function value change by the end user. For example, if the application 48 was a state sales tax calculator, as a wireless subscriber unit 26 moved from one state to another, the sales tax percentage (function value 50) would be updated without any manual user input required. Thus, whenever the user operated the function key 52 to perform the operation of the application 48, the correct sales tax percentage would be calculated.

Figure 3:
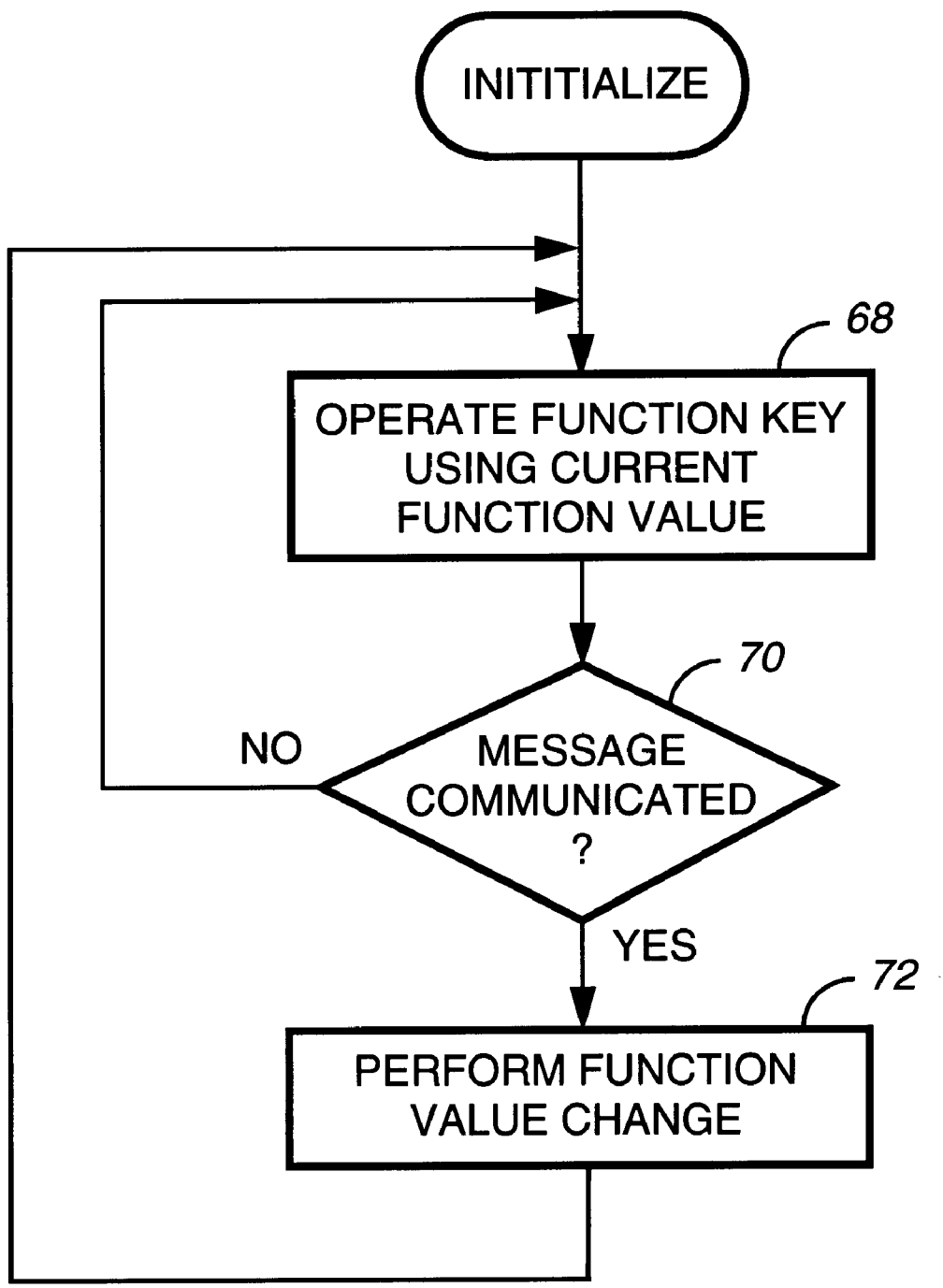
FIG. 3 is a flow chart illustrating the operation of the invention.

FIG. 3 is a flow chart illustrating how the controller 58 is programmed to operate in accordance with the invention. At step 68, the function key 52 is operated using a current function value. Next, in step 70, the system checks for communication of a message. If no message has been communicated, the process returns to the beginning, operating step 68 using the same function value. If a message has been communicated, a function value change is performed in step 72. The process then returns to the beginning, operating step 68 using the new function value.

Figure 4:
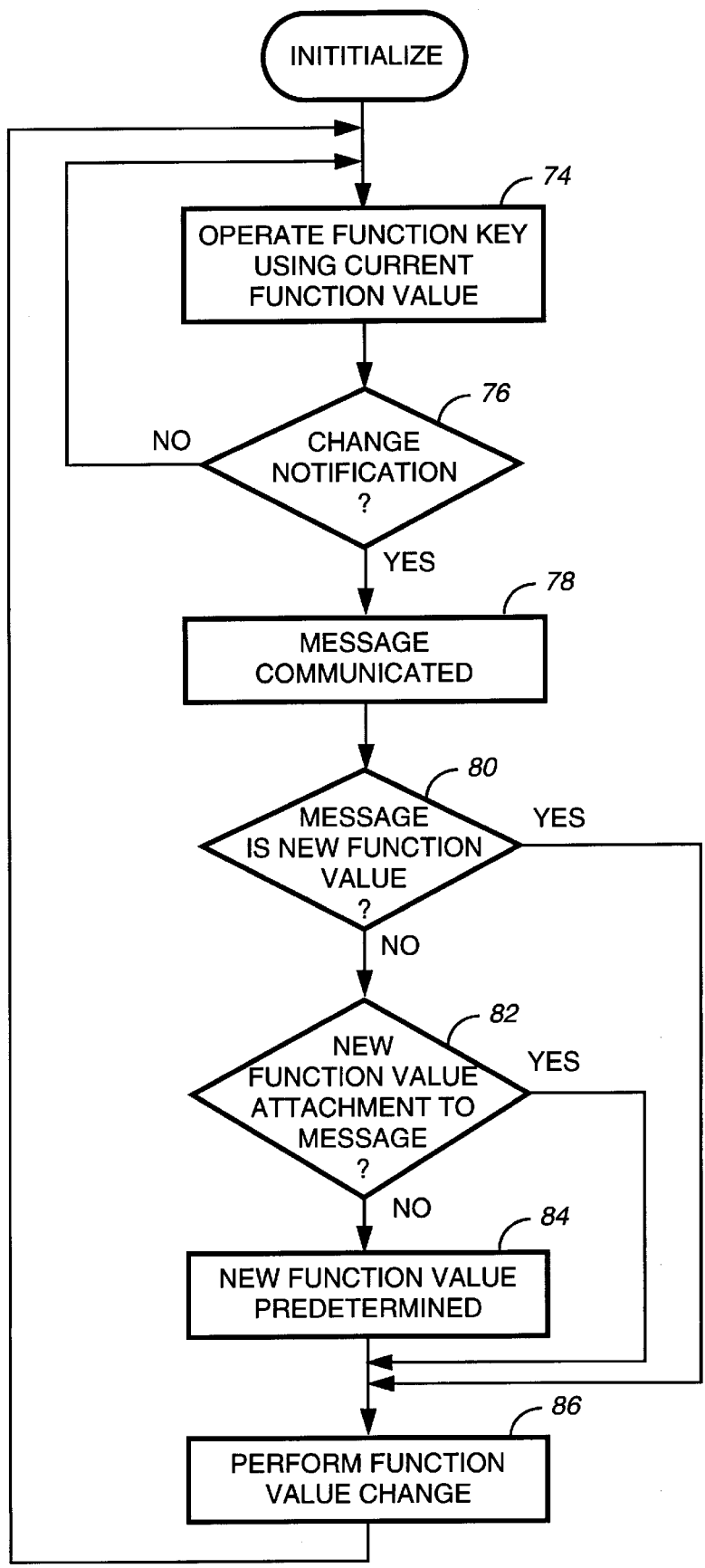
FIG. 4 is a flow chart illustrating more detail of the operation shown in FIG. 3.

FIG. 4 is a flow chart illustrating more detail of the preferred operation of the wireless communication system shown in FIG. 1. In step 74, the function key 52 of the wireless subscriber unit 26 is operated using the function value 50 stored in memory 42. Next, in step 76, the system verifies whether or not a change notification message 28 has been sent from the wireless subscriber unit 26 to the transmission source 21. If a change notification message 28 has not been sent, the process returns to the beginning, operating step 74 using the same function value. If a change notification message 28 has been sent, a message 38 is communicated from the transmission source 21 to the wireless subscriber unit 26 (step 78). Next, in step 80, the controller 58 of the wireless subscriber unit 26 checks if the message 38 is a new function value. If the message 38 is a new function value, a function value change is performed by the controller 58 (step 86), and the process returns to the beginning, operating step 74 using the new function value. If the message 38 is not a new function value, the controller 58 of the wireless subscriber unit 26 checks if a new function value is an attachment 39 to the message 38 (step 82). If a new function value is an attachment to the message 38, a function value change is performed by the controller 58 (step 86), and the process returns to the beginning, operating step 74 using the new function value. If a new function value is not an attachment to the message 38, the controller 58 may optionally use a predetermined algorithm programmed into the controller 58 to create a new function value (step 84). This predetermined algorithm may be, for example, a database calculation based on a factor such as a date, or a command to continue using the most recent function value. Next, a function value change is performed by the controller 58 (step 86), and the process returns to the beginning, operating step 74 using the new function value.

Although the invention has been described in terms of preferred embodiments, it will be obvious to those skilled in the art that various alterations and modifications may be made without departing from the invention. Accordingly, it is intended that all such alterations and modifications be considered as within the spirit and scope of the invention as defined by the appended claims.

What is claimed is:

1. In a wireless communication system including a transmission source and a wireless subscriber unit, in which the wireless subscriber unit has a receiver for receiving a message sent from the transmission source, a memory for storing a function value, and a function key which operates using the function value, a method for updating the function value, comprising:

determining a second function value replacement for a first function value by the transmission source;

communicating a message including the second function value from the transmission source to the wireless subscriber unit;

replacing the first function value with the second function value in the memory location of the wireless subscriber unit; and operating the function key of the wireless subscriber unit using the second function value.

2. A method as recited in claim 1, wherein:

the second function value is the message sent from the transmission source to the wireless subscriber unit.

3. A method as recited in claim 1, wherein:

the second function value is an attachment to the message sent from the transmission source to the wireless subscriber unit.

4. In a wireless subscriber unit having a receiver for receiving a message sent from a transmission source, a memory for storing a function value, and a function key which operates using the function value, a method for updating the function value, comprising:

receiving the message sent from the transmission source including a second function value, wherein the second function value is determined by the transmission source;

replacing a first function value stored in the memory with the second function value in response to receiving the message including the second function value; and operating the function key using the second function value.

5. A method as recited in claim 4, wherein:

the wireless subscriber unit receives the second function value as the message.

6. A method as recited in claim 4, wherein:

the wireless subscriber unit receives the second value function as an attachment to the message.

7. A wireless subscriber unit for receiving a message sent from a transmission source, comprising:

a receiver for receiving the message including a second function value, wherein the second function value is determined by the transmission source;

a message processor coupled to the receiver for processing the received message;

a memory coupled to the message processor for storing a first function value in a memory location;

a function key, responsive to a user input for executing an operation using the first function value stored in the memory location; and a controller, coupled to the function key, for replacing the first function value stored in the memory location with the second function value in response to receiving the message including the second function value from the transmission source.

8. A wireless subscriber unit as described in claim 7, further comprising a transmitter for sending a change notification message to the transmission source.

\* \* \* \* \*